United States Patent
Wilbrink et al.

(10) Patent No.: US 7,496,608 B2
(45) Date of Patent: Feb. 24, 2009

(54) ONLINE SYSTEM AND METHOD FOR RESTORING ELECTRONIC MEDIA ON ELECTRONIC STORAGE DEVICES

(75) Inventors: Tijs I. Wilbrink, En Leiden (NL); Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 11/163,163

(22) Filed: Oct. 7, 2005

(65) Prior Publication Data

US 2007/0083814 A1    Apr. 12, 2007

(51) Int. Cl.
*G06F 17/30* (2006.01)
(52) U.S. Cl. .......................... 707/202; 714/15
(58) Field of Classification Search .......... 707/204, 707/202; 714/15
See application file for complete search history.

(56) References Cited

U.S. PATENT DOCUMENTS

| | | | |
|---|---|---|---|
| 5,910,827 A * | 6/1999 | Kwan et al. ............ | 375/240.27 |
| 7,177,845 B2 * | 2/2007 | DeTreville ............... | 705/57 |
| 2003/0028489 A1 * | 2/2003 | Williamson .............. | 705/59 |
| 2004/0103202 A1 * | 5/2004 | Hildebrand et al. ...... | 709/229 |
| 2005/0004873 A1 * | 1/2005 | Pou et al. ................. | 705/51 |
| 2005/0010616 A1 * | 1/2005 | Burks ...................... | 707/204 |
| 2005/0021919 A1 | 1/2005 | Kroening | |
| 2005/0080743 A1 * | 4/2005 | Ostrover et al. ........... | 705/50 |
| 2006/0064444 A1 * | 3/2006 | van Ingen et al. ........ | 707/204 |
| 2006/0095582 A1 * | 5/2006 | Nitya et al. .............. | 709/236 |

FOREIGN PATENT DOCUMENTS

EP    0 714 204 A2    5/1996

\* cited by examiner

*Primary Examiner*—Mohammad Ali
*Assistant Examiner*—Thuy (Tiffany) Bui
(74) *Attorney, Agent, or Firm*—DeLio & Peterson, LLC; Robert Curcio

(57) ABSTRACT

Copy protected materials are backed up or restored and made available for play on electronic media players through an online retrievable system. Corrupted segments of electronic media storage files are identified and located prior to being read, executed, or played. An uncorrupted copy from the network is then located, and software instructions provide for the storage of the uncorrupted segment of the file on electronic media player, merging the uncorrupted segment into the reading, executing, or playing of the electronic storage media file to seamlessly produce an output in real-time that is indistinguishable from the uncorrupted file.

3 Claims, 3 Drawing Sheets

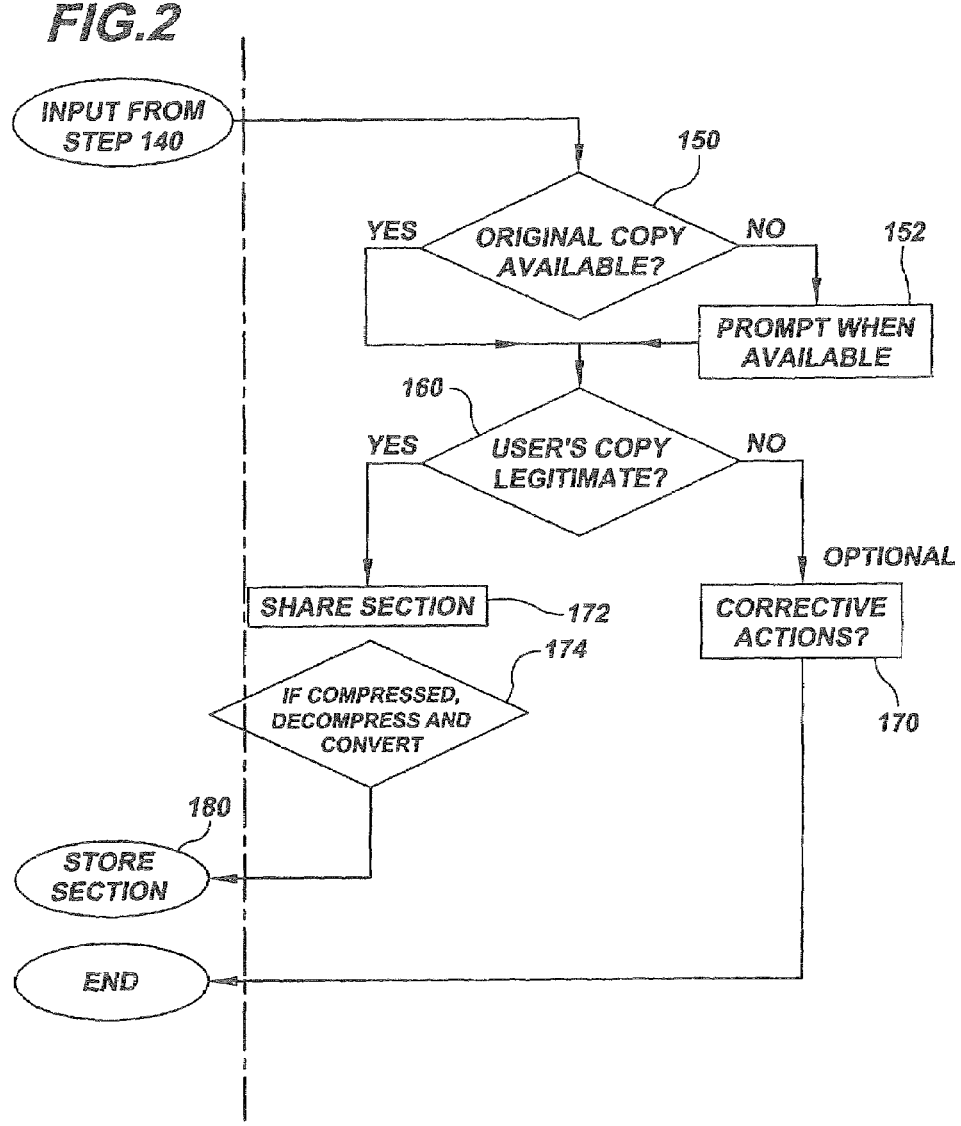

ONLINE SYSTEM AND METHOD FOR RESTORING ELECTRONIC MEDIA ON ELECTRONIC STORAGE DEVICES

BACKGROUND OF THE INVENTION

1. Field of the Invention

This invention relates generally to correcting defects found during the play of electronic storage devices, and more particularly to providing an online system and method for locating, identifying, and backing up electronic media, including copy protected media, on electronic storage devices either in real-time or prior to the play.

2. Description of Related Art

Restoring corrupted electronic files requires an available original or master copy having a pristine version of the corrupted portion for copying. Obtaining an original or master copy of certain files that are copy protected, however, poses additional problems not encountered with non-copy protected files. Copy protection is built into many types of data that are stored in electronic media such as Digital Video Discs (DVD), Compact Discs (CD), and other electronic storage devices. Moreover, various formats are used for storing the information on electronic media, such as CD-audio and MP3, to name a few. MP3 and other compression formats require decompression conversion at some point in the data transfer. MP3 is part of MPEG, an acronym for Motion Pictures Expert Group, a family of standards for displaying video and audio using lossy compression. Regardless of the audio or data formatting schemes, copy protection is generally built-in before purchasing the electronic media in order to protect against unauthorized copying, which is in violation of copyright laws. Unfortunately, copy protection prevents the legitimate copying of files stored on electronic media to a subsequent backup disc to protect against the event the data becomes corrupted. For example, when sections of a music playing compact disc becomes damaged or corrupted, the loss of music information is noticeable as the compact disc is played. The loss of music information usually defined as a skip in the music or a cessation of play.

The prior art has not addressed this problem in real-time, relying instead upon software fixes that require at least a re-formatting or rebooting of the playing system. For example, in U.S. Patent Publication No. US2005/0021919 A1 filed by Kroening on Jul. 24, 2003, entitled "SAVE AND RESTORE OF A PROTECTED AREA," a method, apparatus, system, and signal-bearing medium is taught that saves a protected area of a storage device by booting to a protected area, copying the contents of the protected area to the user area of the storage device, rebooting to the user area, and then saving the user area to a backup storage device.

In the present invention the corrupted files detected are not in a protected area; rather, they are detected either dynamically or by prior analysis. Furthermore, when the files are read, executed, or played, the present invention accesses an uncorrupted copy from the network, stores the uncorrupted segment of the file on a storage device and merges this segment into the reading, executing, or playing of the file to seamlessly produce an output in real-time that is indistinguishable from the uncorrupted file. If the master copy is of a compressed format, the present invention requires decompression as part of the conversion process.

SUMMARY OF THE INVENTION

Bearing in mind the problems and deficiencies of the prior art, it is therefore an object of the present invention to provide a system and method of enabling copy protected files on electronic media to be used and corrected after files have been corrupted.

It is another object of the present invention to provide a system and method of identifying and locating corrupted files within electronic storage media and providing for continuous play of the files after detecting a data corruption.

A further object of the invention is to provide a system and method of correcting copy protected corrupted data files online either dynamically or by prior analysis.

Still other objects and advantages of the invention will in part be obvious and will in part be apparent from the specification.

The above and other objects, which will be apparent to those skilled in art, are achieved in the present invention, which is directed to a method for restoring material on an electronic media player, the method comprising: identifying and locating corrupted file segments on an electronic storage media file played on the electronic media player; accessing an online service provider having a master copy of the electronic storage media file; downloading to the electronic media player uncorrupted file segments from the master copy, the uncorrupted file segments matching the corrupted file segments; and substituting the uncorrupted file segments for the corrupted file segments during play of the electronic storage media file on the electronic media player. The method further includes dynamically identifying and locating the corrupted file segments during play of the electronic storage media file. The electronic storage media file includes compact discs, digital video discs, floppy discs, flash memory, or hard drives. A master copy is located by searching for a unique identifier assigned to the electronic storage media file. Substituting the uncorrupted file segments includes loading the uncorrupted file segments in accessible memory of the electronic media player. The master copy may comprise a compressed audio or data file format. Further method steps include: decompressing the master copy; identifying the uncorrupted file segments; and converting the uncorrupted file segments to a format compatible with the electronic media player if the uncorrupted file segments are not in a compatible format. The step of accessing the online service provider includes accessing a network of peers with a similar data carrier. The method may further include: verifying that the master copy is available from the online service provider; storing any request for the master copy when the master copy is not available but within an accessible database, and prompting a user when the master copy becomes available; and verifying the electronic storage media file meets criteria for determining legitimacy prior to downloading. Routing the user to another online location containing the master copy may occur if the master copy is not available from the online service provider. The method further includes: locating a legitimate copy of the electronic storage media file; offering the user an opportunity to purchase the legitimate copy; and downloading the legitimate copy upon the user's acceptance and payment.

In a second aspect, the present invention is directed to a method for restoring material on an electronic media player, the method comprising: locating a master copy of an electronic storage media file by searching for a unique identifier assigned to the electronic storage media file; identifying and locating corrupted file segments on the electronic storage media file by assigning identifying markers to beginning and end points of the corrupted file segments; accessing an online service provider having a master copy of the electronic storage media file; verifying that the master copy is available from the online service provider; storing any request for the master copy when the master copy is not available but within an accessible database, and prompting a user when the master copy becomes available; verifying the electronic storage media file meets criteria for determining legitimacy prior to downloading; downloading to the electronic media player uncorrupted file segments from the master copy when the electronic storage media file is determined legitimate into accessible memory of the electronic media player, the uncorrupted file segments matching the corrupted file segments; and substituting the uncorrupted file segments for the corrupted file segments during play of the electronic storage media file on the electronic media player. The method further includes: decompressing the master copy when the master copy is in a compressed format; identifying the uncorrupted file segments; and converting the uncorrupted file segments to a format compatible with the electronic media player if the uncorrupted file segments are not in a compatible format.

In a third aspect, the present invention is directed to a program storage device readable by a machine, tangibly embodying a program of instructions executable by the machine to perform method steps for restoring material on an electronic media player, the method steps comprising: locating a master copy of an electronic storage media file by searching for a unique identifier assigned to the electronic storage media file; identifying and locating corrupted file segments on the electronic storage media file by assigning identifying markers to beginning and end points of the corrupted file segments; accessing an online service provider having a master copy of the electronic storage media file; verifying that the master copy is available from the online service provider; storing any request for the master copy when the master copy is not available but within an accessible database, and prompting a user when the master copy becomes available; verifying the electronic storage media file meets criteria for determining legitimacy prior to downloading; downloading to the electronic media player uncorrupted file segments from the master copy when the electronic storage media file is determined legitimate into accessible memory of the electronic media player, the uncorrupted file segments matching the corrupted file segments; and substituting the uncorrupted file segments for the corrupted file segments during play of the electronic storage media file on the electronic media player.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 2 depicts a flowchart of a central online system's handling of a request for replacing corrupted file segments with a non-corrupted version, referred to as "sub process 1".

DESCRIPTION OF THE PREFERRED EMBODIMENTS

Figure 1:
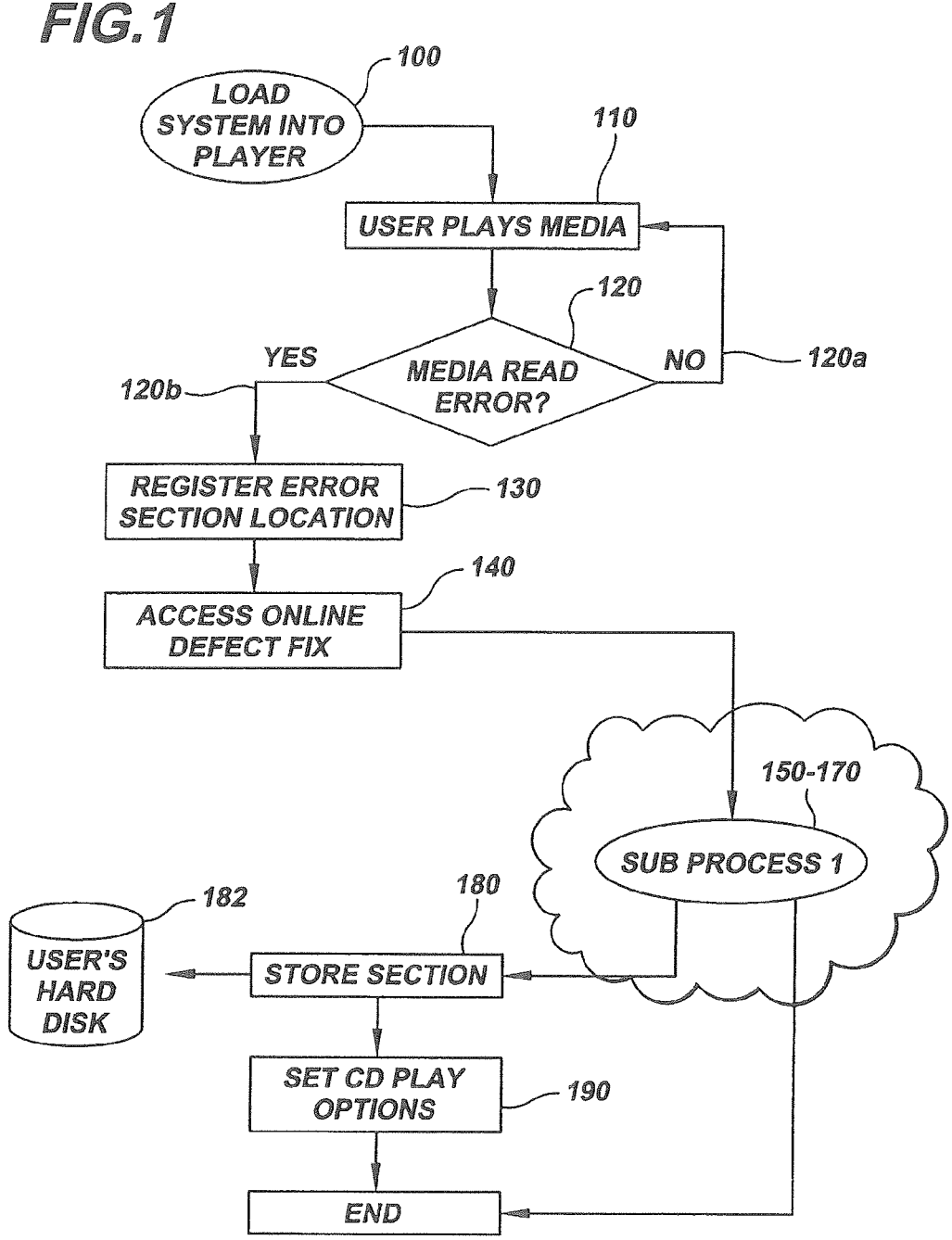
FIG. 1 depicts a flow chart of the main process flow for the present invention.

In describing the preferred embodiment of the present invention, reference will be made herein to FIGS. 1-3 of the drawings in which like numerals refer to like features of the invention.

The invention detects corrupted files on electronic storage media, such as compact discs, DVDs, and the like, either dynamically or by prior analysis. When the files are read, executed, or played, the invention determines which segments of the file are corrupted, accesses an uncorrupted version of the defective segment of the file from the network, stores the uncorrupted file segment on the storage device, and merges this segment into the reading, executing, or playing of the file to seamlessly produce an output that is indistinguishable from the uncorrupted file. Importantly, the preferred solution is not limited to correcting defects in the playing of compact discs, and may be used in a similar manner for any electronic media, such as DVD flash memory, and hard drives, among others. Moreover, the present invention is not limited to any particular type of audio or data format, and may include the transfer and conversion of compressed information, such as MP3, and the like. For simplicity, the examples discussed herein refer to the correction of defects on compact discs and the format normally associated therewith; however, the present invention is not so limited and the methodology discussed herein is equally applicable to other electronic storage media and other electronic audio and data formats.

When music is stored and played on a compact disc, a defect is easily detectable because the compact disc player has difficulty reading a stored section and has to jump to a later section in order to continue the music play. The lapse or jump in the music sequence immediately lets the user know that file segments are unreadable, and may be corrupted. The size and location of the defective area is determined. For example, a defect may be identified and located on a compact disc by defining the play list number and the affected time of play, such as play list no. 3 beginning at time point 3:21 and extending through time point 5:04. In order to eliminate the adverse effects of the identified defective sections within the music play, it is necessary to access and play a replacement segment of these defective sections at the appropriate time. Other ways to identify corrupted segments may be used to locate a defective portion of the compact disc, and the present invention is not limited to any one particular identifying methodology. It is important, however, that the corrupted segments be identified so that their exact replacements may be obtained.

Additionally, in the event that the master copy obtained is a compressed formatted file, such as MP3, it will be necessary to decompress the file and identify the replacement segment prior to transfer, or conversely, transfer the compressed audio or data file and decompress the formatted version at the electronic media player. In either case, the present invention is capable of addressing compressed audio and data files, identifying segmented portions thereof, and downloading the uncorrupted segmented portions for play on the electronic media player.

In a preferred embodiment, in order to provide for correction of corrupted files, a connection is established with an online service. A unique identifier is assigned to the compact disc. Using the unique identifier, the online service provider locates a master copy of the compact disc. The missing/defective portions of the compact disc are selected from the master copy and downloaded within the memory of the device playing the CD. Before the defective portions on the compact disc are involved in the music play, the compact disc player identifies the defective portions of the CD and acquires the non-defective portions of the same segments from the compact disc player memory. When the appropriate time comes to play the corrupted portions, the compact disc player plays the uncorrupted segments from the compact disc player's memory, rather the defective segments on the compact disc.

In a second embodiment, the user has the option of inserting a blank compact disc and building a new compact disc by copying the uncorrupted portions of the CD and merging them with the portions of the file that have been downloaded and are being read, executed or played from memory.

FIG. 1 depicts a flow chart of the main process flow for the present invention. In the first action, step 100, the software performing the restoration and copying of corrupted files is loaded into an electronic storage media player. A user then inserts a compact disc, digital video disc, computer floppy disc, or the like, and plays the selected media, step 110. During play, the compact disc (or other electronic storage media, as previously selected) may exhibit a noticeable defect, presumably skipping a portion of stored files due to a reading error, step 120. If there is no reading error, the disc continues to play, step 120a. If, however, an error is detected, step 120b, the defective segments are located and identified or registered, preferably identifiers are assigned that mark the beginning and end of the defective segments, step 130. This information may be registered with the cluster and sector identifiers that contain the corrupt data. The process then proceeds to access an online service, step 140, to remedy the reading or skipping of corrupted files. In principal, the online service is preferably a service provided by an industry site, such as a site utilized by the music recording industry for music compact discs, or a site utilized by the cinematic recording industry for digital video recordings, to name a few. The invention is not limited to any particular site, as long as the site has a stored version or direct access to a stored version of the non-corrupted audio and data version of the CD, DVD, or the like, and makes a non-corrupted copy accessible to the user through the system programming structure. Additionally, the system may also access a network of peers with similar data carriers provided the network of peers has stored, non-corrupted files that are accessible to the user. The online system then handles the request, steps 150-170, as further discussed below in more detail below with reference to FIG. 2.

FIG. 2 depicts a flowchart of an online system's handling of a request for replacing corrupted file segments with a non-corrupted version, referred to in FIG. 1 as "sub process 1". The online system first checks to verify that an original or master copy is available, step 150. This check is performed with the assistance of the unique identifier assigned to the CD, DVD, or the like. If a copy is not available, but within the database, the online system stores the request, and prompts the user when the original or master copy is available for use, step 152. The user may also be routed to another location that might contain the selected section. Once an original or master copy is available, the online system verifies the legitimacy of the user's disc, step 160. For instance, the online system will check if the compact disc is an original copy. One way that this can be accomplished is by determining if the copy restriction is still intact. Clearly, other more sophisticated methods of verification may be incorporated, and would be implemented in a similar manner as the verification of a copy restriction. If the compact disc fails the verification step, the online service provider will deny downloading non-corrupted segments of the compact disc tract. The online service provider may, however, take the optional step of requesting some form of corrective action, step 170, such as sending the service requestor a notification that an illegal copy is being used. The online service provider may offer also means to pay for and receive a legitimate copy.

The identified, non-corrupted section from the online version is sent to or shared with the user's electronic media player, such as the user's CD player, or the like, step 172. When a shared version is offered, the online system allows the user to download the selected section from a designated online location. This can be accomplished by granting the user a specified URL, or a special user password. A decryption algorithm may also be shared, which would allow for a generally available URL to be used. In order to prepare other electronic media devices to play the same corrupted CD file, it is preferable to allow for multiple downloads of the same affected section.

If the formatted audio and data files are compressed files, as is the case for MP3 files and other compressed formats, the present methodology requires decompression and identification of the uncorrupted segments either online or at the electronic media player, step 174. Preferably, the segments are decompressed and identified at the online service provider and then sent to the electronic media player. In some instances, it may be necessary to convert from one file format to another in order to play the uncorrupted segments on a particular electronic media player. In another embodiment, the decompression algorithm, the conversion algorithm, or both, may be available at the electronic media player. A simpler form of identifying of the uncorrupted file segments in a compressed formatted version may be achieved by first decompressing the audio or data file before identifying the segments. In the event that the electronic media player requires a different format than that offered by the online service provider, a conversion may be implemented online prior to data transfer or at the electronic media player site. FIG. 2, step 174, depicts the conversion happening at the online service provider's site.

Referring to FIG. 1, step 180, the identified, non-corrupted section from the online version is then sent to or shared with the user's electronic media player. Preferably, this section's contents are stored on the user's system, for instance on the hard disc contained within a CD player or computer, or other accessible storage media, step 182. Settings on the user's electronic media player may be set to deal with the backed up section, step 190. When played, the corrupted file section on the compact disc is timely circumvented by playing the seamlessly integrated non-corrupted section from the compact disc player.

During this process, or sometime later, the user is given the option of storing the non-corrupted version on a new compact disc with the other uncorrupted sections. Optionally, the user may register all the electronic media players, which may be updated all at the same time, or sometime later when each one is individually powered on.

The user may also be prompted with quick means to physically fix the compact disc, by cleaning the disc, rotating the reading device, or implementing other physical remedies, such as putting transparent tape on the compact disc to aid positioning, cleaning the lens, vacuuming the machine, realigning the lens, or downloading other drivers. If the quick means for fixing are not successful, the corrupted files must then be replaced during play or sometime before through prior analysis, using the methodology of the present invention.

Figure 3A:
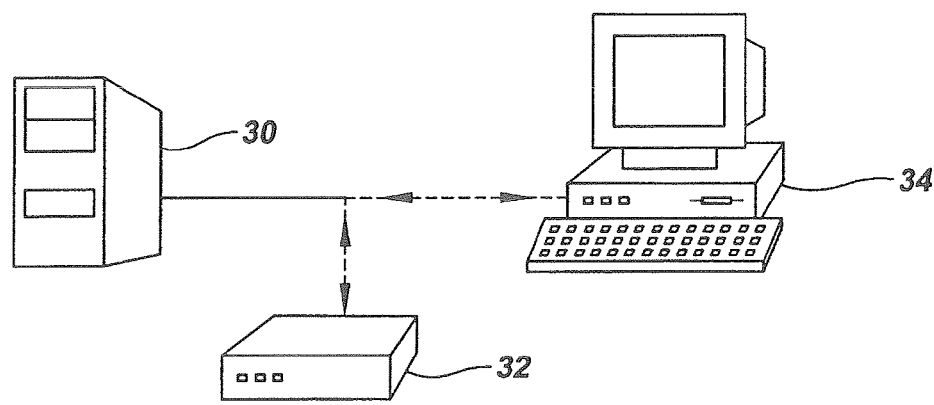
FIG. 3A depicts a network system connected to an electronic media player, either directly or through a personal computer.
Figure 3B:
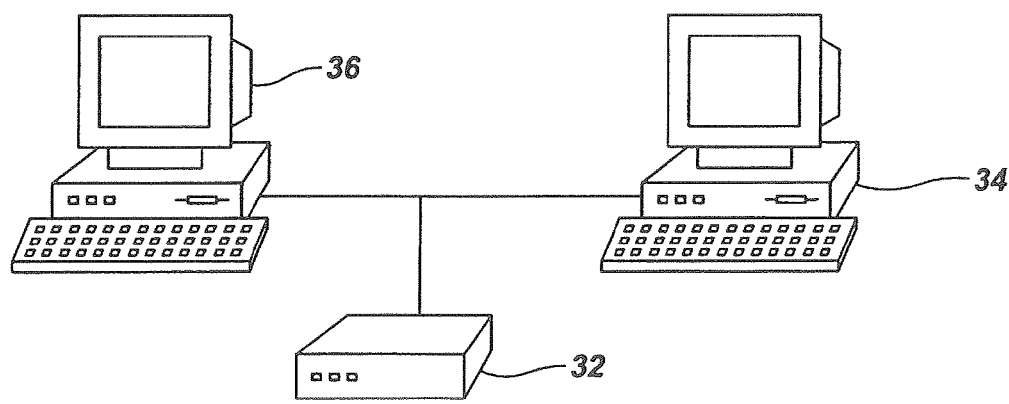
FIG. 3B depicts the electronic media player connected at a peer-to-peer level, having personal computers interconnected to other computers.

FIG. 3 depicts the preferred systems for implementing the present invention. In FIG. 3A, a network system 30 is connected to an electronic media player 32, either directly or through a personal computer 34. The online network provides access to the master copy for downloading within memory of electronic media player 32. Alternatively, as depicted in FIG. 3B, the preferred system may be enacted at a peer-to-peer level, having personal computer 34 interconnected to other computers, represented by computer 36, to access the downloadable master copy for storage in electronic media player 32. The connection between computers is preferably through the Internet, although other hard line or electromagnetic transmission connections are also possible.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for restoring material on an electronic media player, said method comprising:
    locating a master copy of an electronic storage media file by searching for a unique identifier assigned to said electronic storage media file;
    identifying and locating corrupted file segments on said electronic storage media file by assigning identifying markers to beginning and end points of said corrupted file segments;
    accessing an online service provider having a master copy of said electronic storage media file;
    verifying that said master copy is available from said online service provider;
    storing any request for said master copy when said master copy is not available but within an accessible database, and prompting a user when said master copy becomes available;
    verifying said electronic storage media file meets criteria for determining legitimacy prior to downloading;
    downloading to said electronic media player uncorrupted file segments from said master copy when said electronic storage media file is determined legitimate into accessible memory of said electronic media player, said uncorrupted file segments matching said corrupted file segments;
    decompressing said master copy when said master copy is in a compressed format;
    identifying said uncorrupted file segments;
    converting said uncorrupted file segments to a format compatible with said electronic media player if said uncorrupted file segments are not in a compatible format; and
    substituting said uncorrupted file segments for said corrupted file segments during play of said electronic storage media file on said electronic media player.

2. A program storage device readable by a machine, tangibly embodying a program of instructions executable by the machine to perform method steps for restoring material on an electronic media player, said method steps comprising:
    locating a master copy of an electronic storage media file by searching for a unique identifier assigned to said electronic storage media file;
    identifying and locating corrupted file segments on said electronic storage media file by assigning identifying markers to beginning and end points of said corrupted file segments;
    accessing an online service provider having a master copy of said electronic storage media file;
    verifying that said master copy is available from said online service provider;
    storing any request for said master copy when said master copy is not available but within an accessible database, and prompting a user when said master copy becomes available;
    verifying said electronic storage media file meets criteria for determining legitimacy prior to downloading;
    downloading to said electronic media player uncorrupted file segments from said master copy when said electronic storage media file is determined legitimate into accessible memory of said electronic media player, said uncorrupted file segments matching said corrupted file segments;
    decompressing said master copy when said master copy is in a compressed format;
    identifying said uncorrupted file segments;
    converting said uncorrupted file segments to a format compatible with said electronic media player if said uncorrupted file segments are not in a compatible format; and
    substituting said uncorrupted file segments for said corrupted file segments during play of said electronic storage media file on said electronic media player.

3. The program storage device of claim 2 further comprising:
    locating a legitimate copy of said electronic storage media file; offering said user an opportunity to purchase said legitimate copy; and
    downloading said legitimate copy upon said user's acceptance and payment.

* * * * *